United States Patent [19]

Scheibelhoffer

[11] 4,264,751

[45] Apr. 28, 1981

[54] COPOLYESTER RESIN HAVING MINIMAL CARBOXYL TERMINATED ENDS AND METHOD FOR PRODUCING THE SAME

[75] Inventor: Anthony S. Scheibelhoffer, Barberton, Ohio

[73] Assignee: The Goodyear Tire & Rubber Company, Akron, Ohio

[21] Appl. No.: 129,817

[22] Filed: Mar. 12, 1980

[51] Int. Cl.$^3$ .................... C08G 63/76; C08F 283/00
[52] U.S. Cl. .................... 525/437; 528/296; 528/302; 528/309
[58] Field of Search ............... 525/437; 528/296, 302, 528/309

[56] References Cited

U.S. PATENT DOCUMENTS

| | | | |
|---|---|---|---|
| 2,895,946 | 7/1959 | Huffman | 528/296 |
| 3,505,294 | 4/1970 | Ishii et al. | 528/300 |
| 4,013,624 | 3/1977 | Hoeschele | 528/300 |
| 4,124,570 | 11/1978 | Scheibelhoffer et al. | 525/437 |

*Primary Examiner*—Lucille M. Phynes
*Attorney, Agent, or Firm*—J. P. Ward; John H. Hornickey

[57] ABSTRACT

A copolyester resin having minimal carboxyl terminated ends, is disclosed, as well as the method for making it. The esterification-condensation reaction is employed reacting a diol, a dicarboxylic compound, and a chain branching agent. The chain branching agent is limited in concentration to less than 10 mole percent of the dicarboxylic compound and is charged prior to the condensation stage of the reaction. The copolyester resin so produced achieves minimal carboxyl terminated ends, which when used in coatings, yields a clear resin free of carbon dioxide impurities.

18 Claims, No Drawings ered during the esterification stage of the polymerization action. Heretofore, many efforts have been directed to the particular methods for the production of copolyester resins. These copolyester resins have been used frequently in fiber production, coatings, containers and other conventional applications. The molecular weight of the copolyester resin so produced, according to measurement of intrinsic viscosity, vary according to the particular application, and the method for making the differentiated copolyester resins is adjusted accordingly.

COPOLYESTER RESIN HAVING MINIMAL CARBOXYL TERMINATED ENDS AND METHOD FOR PRODUCING THE SAME

BACKGROUND OF THE INVENTION

This invention relates to the production of a copolyester from a diol, a dicarboxylic compound, and a chain branching agent, all three being reacted during the esterification stage of the polymerization action. Heretofore, many efforts have been directed to the particular methods for the production of copolyester resins. These copolyester resins have been used frequently in fiber production, coatings, containers and other conventional applications. The molecular weight of the copolyester resin so produced, according to measurement of intrinsic viscosity, vary according to the particular application, and the method for making the differentiated copolyester resins is adjusted accordingly.

A suitable copolyester resin for coatings was disclosed by this inventor and another in U.S. Pat. No. 4,124,570. However, the copolyester so produced had an acid number from about 10 to about 30, indicating the existence of carboxyl terminated end groups. These acid groups not only react slowly with conventional curing agents used for hydroxyl end groups, but also produce a by-product of carbon dioxide which is deleterious to the clarity of the resin. Therefore, it was necessary to produce a copolyester resin which minimizes the existence of carboxyl terminated end groups. Further, to the extent necessary the excess reactant creating the carboxyl terminated end groups should be eliminated.

The creation of branched copolyester resins has typically employed multi-functional agents to interreact with the chain of an oligomer and become incorporated therein withh at least one functional reactive site remaining. When these multi-functional compounds react at the end of an oligomer or incipient copolyester, the functionality is wasted at the end of the chain maintaining carboxyl groups in a superfluous position with respect to the use of curing agents compatible with hydroxyl end groups. U.S. Pat. Nos. 4,065,438; 4,080,316; 4,058,496; 3,975,566; 3,224,922; and Re. 30,102 all disclose the addition of a multi-functional anhydride compound at percentage concentrations exceeding that found to be necessary for incorporating the multi-functional group in the chain of the backbone rather than the end location. Further, U.S. Pat. Nos. 2,936,296; 3,182,041; 3,281,498; and 3,296,335 all teach the use of an excessive concentration of polyhydric multi-functional compounds for that necessary to place all of the functional groups within the chain of the polyester. Also, U.S. Pat. No. 3,027,279 discloses a multi-functional compound for the purpose of creating a high number of carboxyl end groups.

As described above, the end use of the copolyester resin is determinative of the intrinsic viscosity of the copolyester so produced, and the amount of chain branching necessary in the production of the polyester. U.S. Pat. Nos. 2,895,946; 3,251,809; 3,576,773; and 3,692,744 all disclose polyesters and copolyesters suitable for extrusion, fiber, or film-forming processes where the amount of chain branching is minimized, and hence the concentration of a multi-functional compound is all but eliminated.

Because previous work has not suggested the minimization of the chain branching agent for a polyester or copolyester useful as an industrial coating resin or decorative finish, it is necessary to alter the concentrations and processes from that disclosed in U.S. Pat. No. 4,124,570 to minimize the carboxyl terminated end groups and the excessive concentrations of the multifunctional compound.

OBJECTS OF THE INVENTION

It is therefore an object of the invention to provide a method for the production of a copolyester resin where the reactants are added prior to the condensation stage of the polymerization process.

It is another object of the invention to provide a method for the production of a copolyester resin, wherein the chain branching agent is charged during the esterification stage near its completion.

It is another object of the invention to provide a method for the production of a copolyester resin, wherein the chain branching agent is charged at the beginning of the esterification stage.

It is yet another object of the invention to provide a method for the production of a copolyester resin, wherein the concentration of the chain branching agent is minimized to minimize the formation of deleterious end groups during cross-linkage.

It is yet another object of the invention to provide a copolyester produced by the method as above, wherein the acid number of the copolyester is less than 10.

Moreover, it is an object of the invention to provide a copolyester produced by the method as described above, wherein a chain branching agent produces funtionality within the chain of the polyester suitable for calculated intrinsic viscosities.

It is yet another object of the invention to provide a copolyester resin produced by a method as above, wherein the polyester has a glass transition temperature sufficient to prevent the agglomeration of the resin during storage.

These and other objects, which will become apparent as the detailed description of the preferred embodiment proceeds, are achieved by the method of production of a copolyester resin, comprising: (a) reacting a diol, a dicarboxylic compound, and a chain branching agent in an esterification stage to form a polyester prepolymer; said dicarboxylic compound selected from the group consisting of dicarboxylic acids and dicarboxylic esters, said dicarboxylic acids selected from the group consisting of alkyl dicarboxylic acids having a total of from 2 to 16 carbon atoms, and aryl dicarboxylic acids having a total of from 8 to 16 carbon atoms, said dicarboxylic esters selected from the group consisting of alkyl diesters having from 2 to 20 carbon atoms, and alkyl substituted aryl diesters having from 10 to 20 carbon atoms; said diol in a concentration from about 115 to 220 mole percent of the concentration of said dicarboxylic compound and selected from the group consisting of diols having from 2 to 10 carbon atoms; said chain branching agent in a concentration less than about 10 mole percent of the concentration of said dicarboxylic compound and selected from the group consisting of trimellitic anhydride, pentaerythritol, glycerol, trimethylol propane, triethylol propane, and combinations thereof; and (b) polymerizing said polyester prepolymer in a condensation stage to form a polycondensed copolyester having an intrinsic viscosity from about 0.13 to about 0.26 dl/g, a glass transition temperature of at least 50° C., a hydroxyl number from about 30 to about 70 and an acid number below about 10.

The objects of the invention are also achieved by a copolyester resin comprising: a copolyester produced from the precondensation reaction of a diol, a dicarboxylic compound, and a chain branching agent, said copolyester subsequently condensed; said dicarboxylic compound selected from the group consisting of dicarboxylic acids and dicarboxylic esters, said dicarboxylic acids selected from the group consisting of alkyl dicarboxylic acids having a total of from 2 to 16 carbon atoms, and aryl dicarboxylic acids having a total of from 8 to 16 carbon atoms, said dicarboxylic esters selected from the group consisting of alkyl diesters having from 2 to 20 carbon atoms and alkyl substituted aryl diesters having from 10 to 20 carbon atoms; said diol in a concentration from about 115 to 220 mole percent of the concentration of said dicarboxylic compound and selected from the group consisting of diols having from 2 to 10 carbon atoms; said chain branching agent in a concentration less than about 10 mole percent of the concentration of said dicarboxylic compound and selected from the group consisting of trimellitic anhydride, pentaerythritol, glycerol, trimethylol propane, triethylol propane, and combinations thereof; said condensed copolyester having an intrinsic viscosity from about 0.13 to about 0.26 dl/g, a glass transition temperature of at least 50° C., a hydroxyl number from 30 to about 70 and an acid number below about 10.

DETAILED DESCRIPTION OF THE PREFERRED EMBODIMENTS

The production of the copolyester resin of the present invention employs three stages: an esterification stage, a condensation stage, and a finishing stage. The preparation of the polyester prepolymer occurs in the esterification stage by the reaction of a diol, a dicarboxylic compound, and a chain branching agent. The polyester prepolymer is polycondensed in a condensation stage to produce a copolyester resin having an intrinsic viscosity from about 0.13 to about 0.26 dl/g and preferably from about 0.19 to about 0.21 dl/g.

The dicarboxylic compound of the present invention may be either a dicarboxylic acid or a dicarboxylic ester. The dicarboxylic acids may be an alkyl dicarboxylic acid having a total of from 2 to 16 carbon atoms, or an aryl dicarboxylic acid having a total of from 8 to 16 carbon atoms. Specific examples of alkyl dicarboxylic acids suitable for the present invention are oxalic acid, malonic acid, succinic acid, glutaric acid, adipic acid, pimelic acid, suberic acid, azelaic acid, sebacic acid, and the like. Specific examples of an aryl acid include the various isomers of phthalic acid, such as paraphthalic (terephthalic) acid and naphthalic acid. Specific examples of alkyl substituted aryl acids include the various isomers of dimethylphthalic acid, such as dimethylisophthalic acid, dimethylorthophthalic acid, and dimethylterephthalic acid; the various isomers of diethylphthlic acid, such as diethylisophthalic acid, diethylorthophthalic acid, and diethylterephthalic acid; the various isomers of dimethylnaphthalic acid, such as 2,6-dimethylnaphthalic acid and 2,5-dimethylnaphthalic acid; and the various isomers of diethylnaphthalic acid. Generally dimethylterephthalic acid and terephthalic acid are the preferred dicarboxylic acids.

In lieu of the various dicarboxylic acids, the various diesters thereof may be utilized. Thus, the dicarboxylic compound may be an alkyl diester containing a total of from about 2 to 20 carbon atoms, as well as the alkyl substituted aryl diesters containing from about 10 to about 20 carbon atoms. Examples of specific alkyl diesters include dimethyl adipate, diethyl adipate, and the like. Specific examples of the various alkyl substituted aryl diesters include the various isomers of dimethylphthalate, the various isomers of diethylphthalate, the various isomers of dimethylnaphthalate, and the various isomers of diethylnaphthalate. Of the dicarboxylic diesters, preferably, the various isomers of dimethylphthalate (dimethylterephthalate) are used. Of the dicarboxylic compounds, the various isomers of dimethylterephthalate are most preferred.

These carboxylic acids or the diesters thereof react in the esterification stage with a diol containing from about 2 to 10 carbon atoms. The glycols may be straight-chained or branched. Specific examples include ethylene glycol, propylene glycol, trimethylene glycol, 1,2-butane diol, 1,3-butane diol, 1,4-butane diol, b 2,3-butane diol, neopentyl glycol, hexamethylene glycol, cyclohexane dimethanol, and the ester diol product of neopentyl glycol and hydropavalic acid (propanoic acid, 3-hydroxy-2,2 dimethyl-3 hydroxy-2,2 dimethyl propyl ester). Of the various diols, neopentyl glycol is most preferred. The diol is added to the esterification stage in the reactant charging step in a concentration in comparison to the dicarboxylic compound in a mole ratio from about 2.20 to about 1.15:1. Preferably, the mole ratio is from about 1.7 to about 1.5:1.

The chain branching agent of the present invention is a compound having at least a functionality of three to incorporate within the chain of the polyester prepolymer and retain a branch reactive site. Chain branching agents having at least a trifunctionality include trimellitic anhydride, pentaerythritol, glycerol, trimethylol propane, triethylol propane, and other multi-functional alcohols. The chain branching agent is reacted in the esterification stage in a concentration in comparison with the concentration of the dicarboxylic compound in a mole ratio less than about 0.10:1. Desirably the chain branching agent has a concentration from about 2 to 8 mole percent, comparative to the concentration of the dicarboxylic compound, and preferably in a concentration from about 4 to 5 mole percent.

The esterification stage comprises a reactant charging step and a chain branching agent addition step. The chain branching agent addition step occurs simultaneously with the reactant charging step when the chain branching agent is a multifunctional alchohol such as trimethylol propane, triethylol propane, pentaerythritol, and glycerol. The reactant charging step precedes the chain branching agent addition step when trimellitic anhydride is the chain branching agent. In such later case, the chain branching addition step proceeds after at least 90 percent of the dicarboxylic compound and diol have completed methanolysis. Whereas the esterification stage proceeds uninterrupted or undelayed when the chain branching agent is one of the multi-functional alcohols, an additional 20 minutes is required in the esterification stage before the condensation stage when the trimellitic anhydride is the chain branching agent.

The alteration to the esterification stage by the initial charge of the chain branching agent or near the completion of esterification eliminates the steps disclosed in the condensation stage in U.S. Pat. No. 4,124,570. The condensation stage may proceed according to the present invention unencumbered by the return of the reaction vessel in the condensation stage to an atmospheric pressure for the addition of trimellitic anhydride. It has been found that the precision with which the accurate trimellitic anhydride addition point way occur encumbers the overall economy of the polymerization reaction, which the reduction of the concentration of the chain branching agent and its prior addition avoids, according to the concepts of the present invention. The alterations to the esterification stage unexpectedly generate a more precise reaction process, yielding a copolyester resin having greater clarity and reduced acid numbers. For an understanding of the alterations to the process and its effect upon the copolyester resin so produced, reference is had to the following example.

EXAMPLE I

ESTERIFICATION STAGE

The reactants were charged in a ratio of 1.8/1.0/0.04 neopentyl glycol/dimethylterephthalate/trimethylol propane into a reactor. The reactants were heated in the reactor and agitation was begun when the batch became molten. When the internal temperature reached 190° C., a catalyst, comprising dibutyl tin oxide, was charged into the reactors.

The column head temperature was controlled at 54° C. to 70° C. with the lower half of the column and liquid return line being heated to prevent freezing of the glycol rich reflux. When the column head temperature began to rise, indicating a methanolysis reaction, the vessel jacket temperature was raised to 215° C. to 220° C. This temperature was maintained at atmospheric pressure until at least 90 percent of the methanolysis reaction was completed. The internal temperature of the reactor was controlled so that the neopentyl glycol did not boil at 215° C. After a reaction time of about 150 minutes, the batch was transferred to the condensation reactor through a fine pore size filter.

Condensation Stage

The second stage vessel jacket oil temperature was set at 220° C. to 225° C. until the batch from the esterification stage was transferred to this vessel. The oil temperature was then set at about 240° C. to 260° C. and adjusted to provide an internal temperature of about 200° to about 250° C. After the transfer of the batch to the condensation reaction vessel was complete, a vacuum cycle was initiated at about 15 millimeters/minutes from atmospheric pressure to about 100 millimeters Hg. The rate was then changed to 8 millimeters/minute until a base pressure of about 40 millimeters Hg was reached. With an internal temperature of about 200° C., polycondensation proceeded until the desired reaction end point was reached. The pressure was then raised rapidly to about ½ atmosphere in the batch transfer to the cooling vessel which was held at atmospheric pressure. A fine pore size filtration was employed during the transfer.

Finishing Stage

The cooling vessel jacket temperature was set at about 125° C. when the batch was transferred in. The batch was cooled with mild agitation to about 150° C. at a vessel pressure range of 500 to 760 millimeters Hg. The vessel jacket was regulated to control the product temperature at 150° C. for discharge. The product was discharged, cooled, and flaked.

The differentiation between the reactant step and the chain branching step in the esterification stage is illustrated by Example II.

EXAMPLE II

The reaction parameters and processes of Example I were repeated, except that the chain branching agent was not initially charged prior to the methanolysis reaction of the dimethylterephthalate and the neopentyl glycol. When at least 90 percent of the methanolysis reaction was complete, the trimellitic anhydride, in a concentration of 4 mole percent relative to the initial charge of dimethylterephthalate, was added to the esterification reactor. The internal reaction temperature was maintained at about 190° C. for an additional 20 minutes prior to the completion of the esterification stage. All other aspects of Example I remained the same. The experimentation conducted according to production of copolyesters illustrated by Examples I and II may be examined by reference to Table I and Table II.

As may be seen with reference to Table I, the acid number is minimized when the mole percentage of trimellitic anhydride is less than 10 in comparison with the dicarboxylic compound. This indicates that the probability of carboxyl terminated end groups for the copolyester resin is minimized or eliminated. Further, in the desired range of intrinsic viscosity from about 0.13 to about 0.26, as little as 3 mole percent of the trimellitic anhydride may produce the desired result.

With reference to Table II, similar results employing a minimal percentage of trimethylol propane is seen. In the desired intrinsic viscosity from about 0.13 to about 0.26, carboxyl terminated end groups are minimized or eliminated with a mole percentage as low as 4 percent relative to the dicarboxylic compound.

TABLE I

PROPERTIES OF NEOPENTYL TEREPHTHALATE/TRIMELLITIC ANHYDRIDE

| Mole % TMA | IV dl/g | Acid No. | Hydroxyl No. | Tg (°C.) |
|---|---|---|---|---|
| 3 | 0.097 | 0 | 87.5 | 46 |
| 3 | 0.018 | 0 | 66.0 | 54 |
| 3 | 0.133 | 0 | 52.1 | 57.5 |
| 3 | 0.203 | 0 | 38.1 | 62 |
| 3 | 0.246 | 0 | 31.0 | 65 |
| 3 | 0.294 | 0 | 26.1 | 65 |
| 3 | 0.353 | 0 | 31.1 | 67 |
| 6 | 0.125 | 0.9 | 58.4 | 57 |
| 6 | 0.160 | 0.1 | 52.6 | 60 |
| 6 | 0.182 | 0.06 | 45.1 | 62 |
| 6 | 0.233 | 0.06 | 37.9 | 64 |
| 6 | 0.281 | 0.06 | 36.2 | 65 |
| 10 | 0.129 | 2 | 69.8 | 55.5 |
| 10 | 0.146 | 1.3 | 60.6 | 58 |
| 10 | 0.153 | 0.95 | 57.3 | 60 |
| 10 | 0.188 | 0.73 | 55.2 | 61 |
| 10 | 0.246 | 0.22 | 48.2 | 63.5 |
| 10 | 0.418 | 0.22 | 41.8 | 65 |
| 15 | 0.125 | 10.8 | 73.8 | 56.5 |
| 15 | 0.153 | 8.3 | 66.6 | 59 |
| 15 | 0.178 | 6.8 | 60.4 | 60.5 |
| 15 | 0.185 | 6.1 | 59.1 | 61 |
| 15 | 0.225 | 5.2 | 52.5 | 62 |
| 15 | 0.272 | 4.6 | 51.1 | 63 |

TABLE II

PROPERTIES OF NEOPENTYL TEREPHTHALATE/TRIMETHYLOL PROPANE COPOLYMERS

| Mole % TMA | IV dl/g | Acid No. | Hydroxyl No. | Tg (°C.) |
|---|---|---|---|---|
| 4 | 0.114 | 0 | 68.9 | 55 |
| 4 | 0.122 | 0 | 63.6 | 55 |
| 4 | 0.130 | 0 | 59.5 | 58 |

TABLE II-continued

PROPERTIES OF NEOPENTYL TEREPHTHALATE/
TRIMETHYLOL PROPANE COPOLYMERS

| Mole % TMA | IV dl/g | Acid No. | Hydroxyl No. | Tg (°C.) |
|---|---|---|---|---|
| 4 | 0.147 | 0.17 | 47.5 | 60 |
| 4 | 0.176 | 0 | 42.0 | 64 |
| 4 | 0.188 | 0 | 37.7 | 64 |
| 4 | 0.199 | 0 | 37.5 | 64 |
| 4 | 0.245 | 0 | 32.7 | 66 |
| 4 | 0.160 | 0 | 48.3 | 61 |
| 4 | 0.168 | 0 | 45.7 | 61.5 |
| 4 | 0.181 | 0 | 43.1 | 63 |
| 4 | 0.215 | 0 | 38.4 | 66 |
| 4 | 0.262 | 0 | 38.2 | 67 |
| 4 | 0.351 | 0 | — | 67.5 |
| 8 | 0.113 | 0.4 | 77.3 | 52 |
| 8 | 0.130 | 0.2 | 63.2 | 56 |
| 8 | 0.140 | 0.1 | 60.0 | 58 |
| 8 | 0.154 | 0 | 59.3 | 60 |
| 8 | 0.169 | 0.2 | 52.4 | 62 |
| 8 | 0.179 | 0 | 51.8 | 63 |
| 8 | 0.187 | 0 | 49.7 | 63 |
| 10 | 0.123 | 0 | 77.1 | 54 |
| 10 | 0.141 | 0.1 | 55.2 | 58 |
| 10 | 0.164 | 0 | 56.8 | 60 |
| 10 | 0.179 | 0 | 51.1 | 62 |
| 10 | 0.195 | 0 | 49.4 | 62 |
| 10 | 0.212 | 0 | 44.5 | 63 |

Thus, a copolyester resin suitable for industrial coating or decorative finishes is produced with the minimum percentage of the chain branching agent incorporated into the polyester backbone. Any excess chain branching agent which is free to disrupt the clarity and the rapidity of the reaction is minimized or eliminated by reduced initial concentration of that agent.

In the esterification stage, various catalysts may be used. Examples of these catalysts include dibutyl tin oxide, sodium acetate, stannous octoate, butyl hydroxy tin chloride, zinc acetate, and titanium glycollate.

Curing agents suitable for the hydroxyl terminated end groups may be used. Representative examples include a caprolactam-blocked isophorone diisocyanate such as Cargill CR2400 and a melamine such as American Cyanamid Cymel 300.

To prevent agglomeration of the powder during storage the resins of the invention should have a Tg range at least from 50 to about 80. As seen in Table I and Table II, the minimized mole percentages of the chain branching agent within the desired intrinsic viscosity range produces copolymers having a glass transition temperature within the range of 50 to 80. Also seen in Table I and Table II are the hydroxyl numbers for the resin of the present invention, ranging from about 30 to about 70 and preferably 40 to about 45.

Powder coating resins may be produced from the copolyester resin of the present invention by compounding with pigments, flow agents, and curing agents and curing agents for application to appliances, outdoor furniture, and the like.

While in accordance with patent statutes a best mode and preferred embodiment of the invention have been disclosed, the invention is not to be limited thereto or thereby. Consequently for an understanding of the scope of the invention, reference is had to the following claims.

What is claimed is:

1. A method for the production of a copolyester resin comprising:

(a) reacting a diol, a dicarboxylic compound, and a chain branching agent in an esterification stage to form a polyester prepolymer;
    said dicarboxylic compound selected from the group consisting of dicarboxylic acids and dicarboxylic esters, said dicarboxylic acids selected from the group consisting of alkyl dicarboxylic acids having a total of from 2 to 16 carbon atoms, and aryl dicarboxylic acids, having a total of from 8 to 16 carbon atoms, said dicarboxylic esters selected from the group consisting of alkyl diesters having from 2 to 20 carbon atoms, and alkyl substituted aryl diesters having from 10 to 20 carbon atoms;
    said diol in a concentation from about 115 to 220 mole percent of the concentration of said dicarboxylic compound and selected from the group consisting of diols having from 2 to 10 carbon atoms;
    said chain branching agent in a concentration less than about 10 mole percent of the concentration of said dicarboxylic compound and selected from the group consisting of trimellitic anhydride, pentaerythritol, glycerol, trimethylol propane, triethylol propane, and combination thereof; and
    (b) polymerizing said polyester prepolymer in a condensation stage to form a polycondensed copolyester having an intrinsic viscosity from about 0.13 to about 0.26 dl/g, a glass transition temperature of at least 50° C., a hydroxyl number from about 30 to about 70 and an acid number below about 10.

2. A method for the production of a copolyester resin, according to claim 1, wherein said esterification stage comprises a reactant charging step and a chain branching agent addition step.

3. A method for the production of a copolyester resin, according to claim 2, wherein said reactant charging step and said chain branching addition step are simultaneous.

4. A method for the production of a copolyester resin, according to claim 3, wherein said chain branching agent is selected from a group consisting of pentaerythritol, glycerol, trimethylol propane, triethylol propane, and combinations thereof.

5. A method for the production of a copolyester resin, according to claim 4, wherein said concentration of said chain branching agent is from about 2 mole percent to about 8 mole percent of the concentration of said dicarboxylic compound.

6. A method for the production of a copolyester resin, according to claim 5, wherein said concentration of said chain branching agent is from about 4 mole percent to about 5 mole percent of the concentration of said dicarboxylic compound.

7. A method for the production of a copolyester resin, according to claim 2, wherein said chain branching agent is trimellitic anhydride, and wherein said chain branching agent addition step occurs after about 90 percent of methanolysis has occurred during said reactant charging step.

8. A method for the production of a copolyester resin, according to claim 7, wherein said trimellitic anhydride is in a concentration from about 2 mole percent to about 8 mole percent of the concentration of said dicarboxylic compound.

9. A method for the production of a copolyester resin, according to claim 8, wherein said trimellitic anhydride is in a concentration from about 4 mole percent to about 5 mole percent of the concentration of said dicarboxylic compound.

10. A method for the production of a copolyester resin, according to claims 6 or 9, wherein said dicarboxylic compound is dimethylterephthalate and said diol is neopentyl glycol.

11. A copolyester resin, comprising:
a copolyester produced from the precondensation reaction of a diol, a dicarboxylic compound, and a chain branching agent, said copolyester subsequently condensed;
said dicarboxylic compound selected from the group consisting of dicarboxylic acids and dicarboxylic esters, said dicarboxylic acids selected from the group consisting of alkyl dicarboxylic acids having a total of from 2 to 16 carbon atoms, and aryl dicarboxylic acids having a total of from 8 to 16 carbon atoms, said dicarboxylic esters selected from the group consisting of alkyl diesters having from 2 to 20 carbon atoms and alkyl substituted aryl diesters having from 10 to 20 carbon atoms;
said diol in a concentration from about 115 to 220 mole percent of the concentration of said dicarboxylic compound and selected from the group consisting of diols having from 2 to 10 carbon atoms;
said chain branching agent in a concentration less than about 10 mole percent of the concentration of said dicarboxylic compound and selected from the group consisting of trimellitic anhydride, pentaerythritol, glycerol, trimethylol propane, triethylol propane, and combinations thereof;
said condensed copolyester having an intrinsic viscosity from about 0.13 to about 0.26 dl/g, a glass transition temperature of at least 50° C., a hydroxyl number from 30 to about 70 and an acid number below about 10.

12. A copolyester resin, according to claim 11, wherein said chain branching agent is in a concentration from about 2 mole percent to about 8 mole percent of the concentration of said dicarboxylic compound.

13. A copolyester resin, according to claim 12, wherein said chain branching agent is in a concentration from about 4 mole percent to about 5 mole percent of the concentration of said dicarboxylic compound.

14. A copolyester resin, according to claim 11, wherein said dicarboxylic compound is dimethylterephthalate and said diol is neopentyl glycol.

15. A copolyester resin, according to claim 11, wherein said precondensation reaction comprises a reactant charging step and a chain branching addition step.

16. A copolyester resin, according to claim 15, wherein said reactant charging step and said chain branching addition step are simultaneous.

17. A copolyester resin, according to claim 16, wherein said chain branching agent is selected from a group consisting of pentaerythritol, glycerol, trimethylol propane, triethylol propane, and combinations thereof.

18. A copolyester resin, according to claim 15, wherein said chain branching agent is trimellitic anhydride, and wherein said chain branching agent addition step occurs after about 90 percent of methanolysis has occurred during said reactant charging step.

* * * * *

REEXAMINATION CERTIFICATE (1630th)
United States Patent [19]
Scheibelhoffer

[11] B1 4,264,751

[45] Certificate Issued Jan. 28, 1992

[54] COPOLYMER RESIN HAVING MINIMAL CARBOXYL TERMINATED ENDS AND METHOD FOR PRODUCING THE SAME

[75] Inventor: Anthony S. Scheibelhoffer, Barberton, Ohio

[73] Assignee: Goodyear Tire and Rubber Company

Reexamination Request:
No. 90/001,438, Feb. 4, 1988
No. 90/001,782, Jun. 7, 1989

Reexamination Certificate for:
Patent No.: 4,264,751
Issued: Apr. 28, 1981
Appl. No.: 129,817
Filed: Mar. 12, 1980

[51] Int. Cl.$^5$ .................. C08G 63/76; C08F 283/00
[52] U.S. Cl. .................................. 525/437; 528/296; 528/302; 528/309
[58] Field of Search ............ 528/272, 296, 300, 308.3, 528/308.6, 308.7, 309.1; 525/437

[56] References Cited
U.S. PATENT DOCUMENTS

| | | | |
|---|---|---|---|
| 3,842,021 | 10/1974 | Grant et al. | 428/402 |
| 4,107,148 | 8/1978 | Fujiyoshi | 528/273 |
| 4,124,570 | 11/1978 | Scheibelhoffer et al. | 528/273 |
| 4,197,355 | 4/1980 | Tobias | 428/458 |
| 4,264,751 | 4/1981 | Scheibelhoffr | 525/437 |

FOREIGN PATENT DOCUMENTS 51-24630 2/1976 Japan.
51-151728 12/1976 Japan.

OTHER PUBLICATIONS

Textbook of Polymer Science of F. W. Billmeyer, 2d Ed., Interscience Publishers, a Division of John Wiley and Sons, New York, 1976, Cover Pages and pp. 79–85.
Hackh's Chemical Dictionary, Fourth Edition, McGraw-Hill, 1969, Cover Pages and pp. 173, 248, 533–535.
Office Action from the Prosecution of W. German Patent Application P 31 09 038.9 of Goodyear; The German Counterpart of the '751 Patent.
Pages 95, 101, 120, and 124–136 Inclusive of Goodyear Intrinsic Viscosity Test Method R-100e Submitted to the U.S. Environmental Protection Agency in Support of Its PMN 81-508.
Affidavit of John McLafferty.

*Primary Examiner*—John Kight

[57] ABSTRACT

A copolyester resin having minimal carboxyl terminated ends, is disclosed, as well as the method for making it. The esterification-condensation reaction is employed reacting a diol, a dicarboxylic compound, and a chain branching agent. The chain branching agent is limited in concentration to less than 10 mole percent of the dicarboxylic compound and is charged prior to the condensation stage of the reaction. The copolyester resin so produced achieves minimal carboxyl terminated ends, which when used in coatings, yields a clear resin free of carbon dioxide impurities.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-18 are cancelled.

* * * * *

REEXAMINATION CERTIFICATE (1630th)

United States Patent [19]
Scheibelhoffer

[11] B1 4,264,751
[45] Certificate Issued  Jan. 28, 1992

[54] COPOLYMER RESIN HAVING MINIMAL CARBOXYL TERMINATED ENDS AND METHOD FOR PRODUCING THE SAME

[75] Inventor: Anthony S. Scheibelhoffer, Barberton, Ohio

[73] Assignee: Goodyear Tire and Rubber Company

Reexamination Request:
No. 90/001,438, Feb. 4, 1988
No. 90/001,782, Jun. 7, 1989

Reexamination Certificate for:
Patent No.: 4,264,751
Issued: Apr. 28, 1981
Appl. No.: 129,817
Filed: Mar. 12, 1980

[51] Int. Cl.$^5$ .................... C08G 63/76; C08F 283/00
[52] U.S. Cl. .................... 525/437; 528/296; 528/302; 528/309
[58] Field of Search ............ 528/272, 296, 300, 308.3, 528/308.6, 308.7, 309.1; 525/437

[56]                    References Cited
U.S. PATENT DOCUMENTS

| | | | |
|---|---|---|---|
| 3,842,021 | 10/1974 | Grant et al. ........................ | 428/402 |
| 4,107,148 | 8/1978 | Fujiyoshi ............................ | 528/273 |
| 4,124,570 | 11/1978 | Scheibelhoffer et al. ........... | 528/273 |
| 4,197,355 | 4/1980 | Tobias ................................ | 428/458 |
| 4,264,751 | 4/1981 | Scheibelhoffr ..................... | 525/437 |

FOREIGN PATENT DOCUMENTS
51-24630  2/1976  Japan .
51-151728  12/1976  Japan .

OTHER PUBLICATIONS

Textbook of Polymer Science of F. W. Billmeyer, 2d Ed., Interscience Publishers, a Division of John Wiley and Sons, New York, 1976, Cover Pages and pp. 79–85.
Hackh's Chemical Dictionary, Fourth Edition, McGraw-Hill, 1969, Cover Pages and pp. 173, 248, 533–535.
Office Action from the Prosecution of W. German Patent Application P 31 09 038.9 of Goodyear; The German Counterpart of the '751 Patent.
Pages 95, 101, 120, and 124–136 Inclusive of Goodyear Intrinsic Viscosity Test Method R-100e Submited to the U.S. Environmental Protection Agency in Support of Its PMN 81-508.
Affidavit of John McLafferty.

*Primary Examiner*—John Kight

[57]                    ABSTRACT

A copolyester resin having minimal carboxyl terminated ends, is disclosed, as well as the method for making it. The esterification-condensation reaction is employed reacting a diol, a dicarboxylic compound, and a chain branching agent. The chain branching agent is limited in concentration to less than 10 mole percent of the dicarboxylic compound and is charged prior to the condensation stage of the reaction. The copolyester resin so produced achieves minimal carboxyl terminated ends, which when used in coatings, yields a clear resin free of carbon dioxide impurities.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-18 are cancelled.

* * * * *